United States Patent
Konji

(10) Patent No.: US 12,477,602 B2
(45) Date of Patent: Nov. 18, 2025

(54) COMMUNICATION APPARATUS, CONTROL METHOD, AND SYSTEM

(71) Applicant: Canon Kabushiki Kaisha, Tokyo (JP)

(72) Inventor: Mitsuru Konji, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 333 days.

(21) Appl. No.: 18/305,493

(22) Filed: Apr. 24, 2023

(65) Prior Publication Data

US 2023/0354449 A1    Nov. 2, 2023

(30) Foreign Application Priority Data

May 2, 2022    (JP) .................... 2022-076223

(51) Int. Cl.
*H04W 76/10*    (2018.01)
*H04W 76/14*    (2018.01)

(52) U.S. Cl.
CPC .................... *H04W 76/14* (2018.02)

(58) Field of Classification Search
CPC .......... H04M 1/72415; H04M 1/72412; H04L 63/083; H04N 1/00395; H04N 1/00411; H04N 1/0048; H04W 12/06; H04W 84/12; H04W 76/10; H04W 76/14
See application file for complete search history.

(56) References Cited

U.S. PATENT DOCUMENTS

| | | | |
|---|---|---|---|
| 6,714,313 B1 * | 3/2004 | Sugaya .................. | G06F 3/1205 358/1.9 |
| 9,971,553 B2 | 5/2018 | Konji | |
| 10,489,173 B2 | 11/2019 | Sumiuchi | |
| 10,848,609 B2 | 11/2020 | Konji | |
| 11,321,029 B2 | 5/2022 | Konji | |
| 11,962,842 B1 * | 4/2024 | Singh ............... | H04N 21/43615 |
| 12,418,951 B2 * | 9/2025 | Asakura ............. | H04W 12/062 |
| 12,418,961 B2 * | 9/2025 | Miyake ................ | H04W 76/12 |
| 2016/0164725 A1 * | 6/2016 | Wu ........................ | H04L 12/40 370/257 |
| 2017/0223748 A1 * | 8/2017 | Sumiuchi ............. | H04W 76/34 |
| 2019/0020766 A1 * | 1/2019 | Omori ................ | H04N 1/00127 |
| 2020/0084313 A1 * | 3/2020 | Koizumi ............ | H04N 1/00411 |
| 2021/0298363 A1 * | 9/2021 | Daugherty ............. | A24F 40/60 |
| 2022/0279346 A1 * | 9/2022 | Asakura ................ | H04W 76/10 |
| 2022/0312207 A1 * | 9/2022 | Bang ..................... | H04L 63/105 |
| 2022/0353679 A1 * | 11/2022 | Shibata ................ | H04W 12/06 |

(Continued)

FOREIGN PATENT DOCUMENTS

JP    2021027378 A    2/2021

*Primary Examiner* — Cindy Trandai
(74) *Attorney, Agent, or Firm* — Venable LLP

(57) ABSTRACT

A communication apparatus includes: an attempt unit configured to attempt establishment of first wireless connection between the external access point and the communication apparatus using second information; a start unit configured to start, based on a failure of the attempted establishment of the first wireless connection, an operation in a predetermined mode, in the communication apparatus, for establishing second wireless connection without intervention of the external access point between the information processing apparatus and the communication apparatus; and a connection unit configured to establish the second wireless connection after the start of the operation in the predetermined mode.

17 Claims, 7 Drawing Sheets

(56) References Cited

U.S. PATENT DOCUMENTS

| | | |
|---|---|---|
| 2023/0135980 A1 | 5/2023 | Konji |
| 2023/0269567 A1* | 8/2023 | Yang .................... H04W 76/11 455/41.3 |
| 2024/0193555 A1* | 6/2024 | Sundholm ............... B65F 5/005 |

* cited by examiner

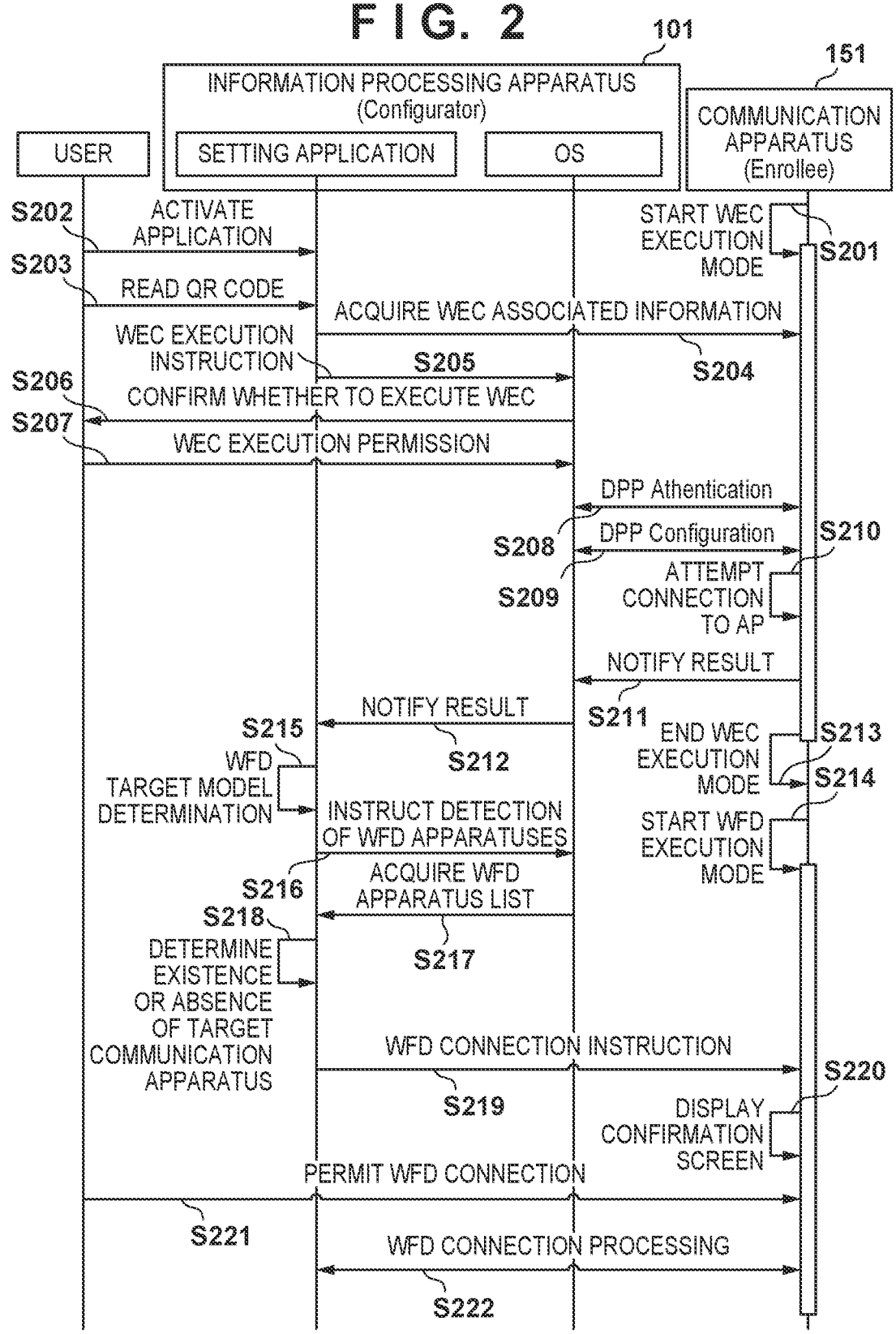

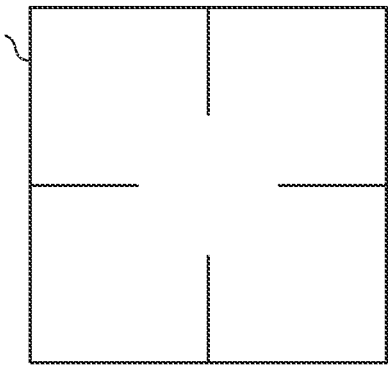

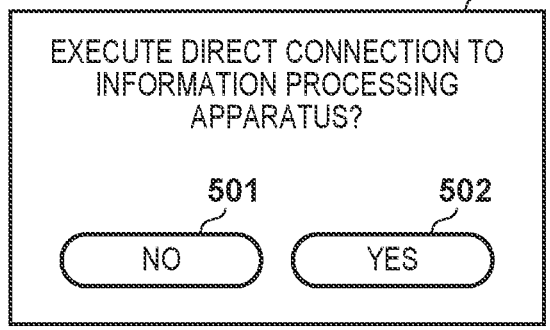
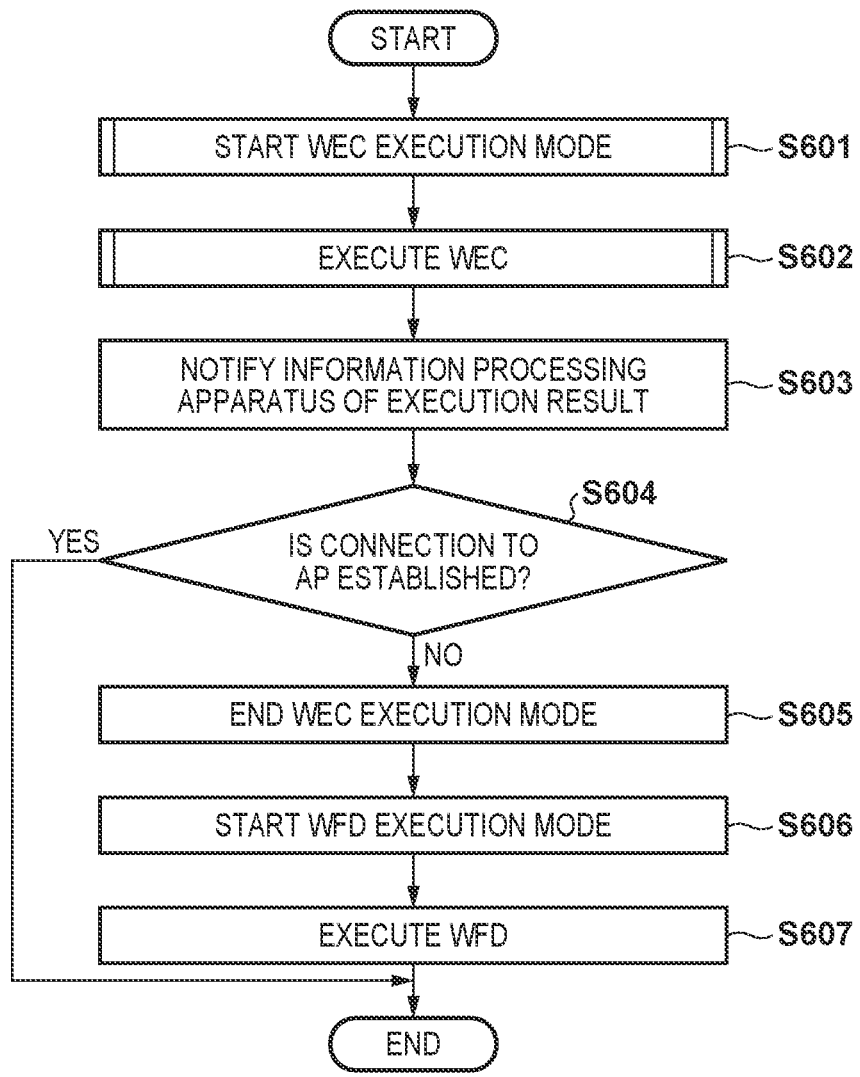

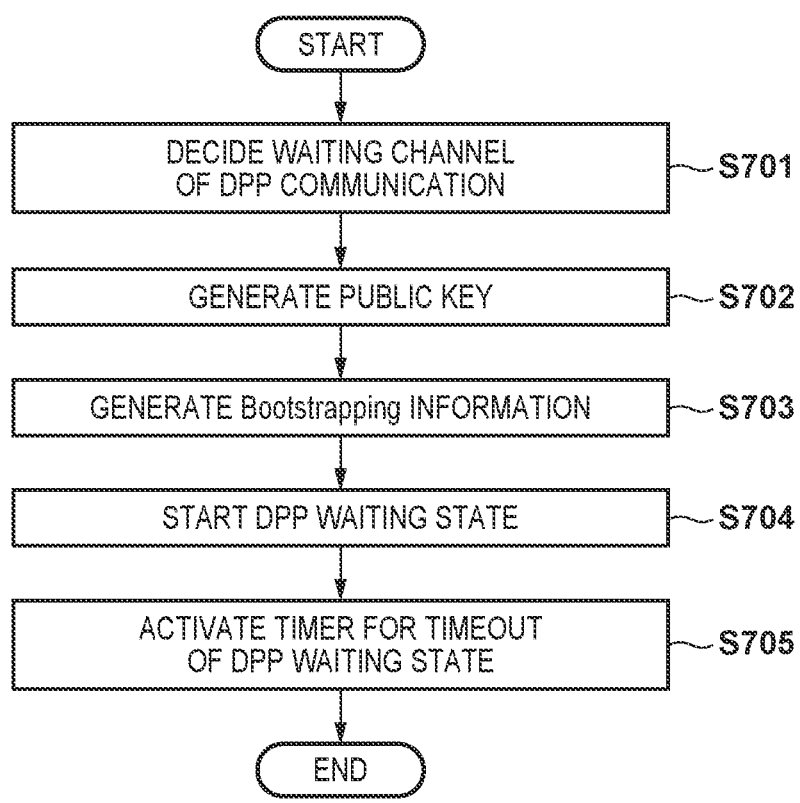

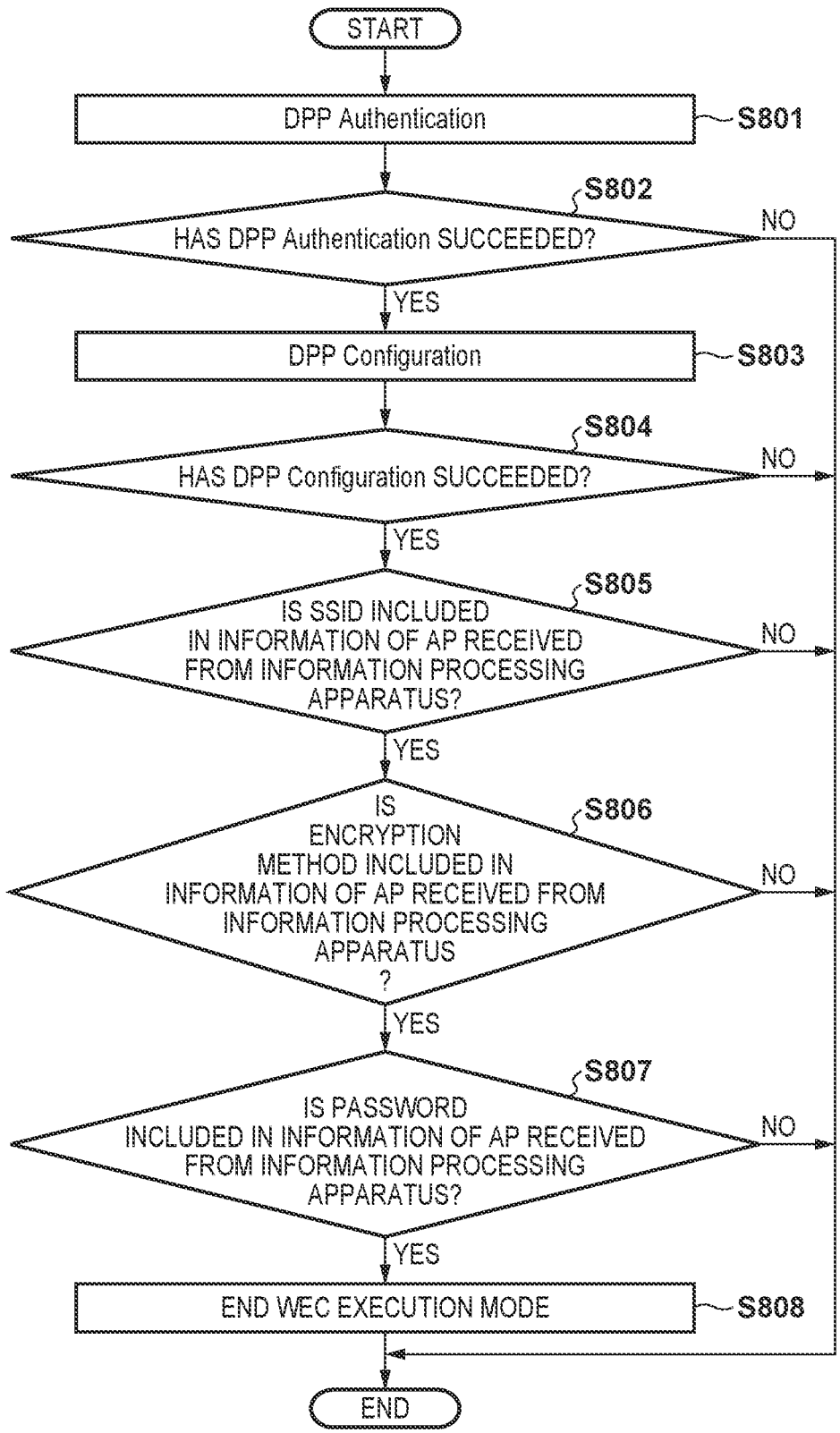

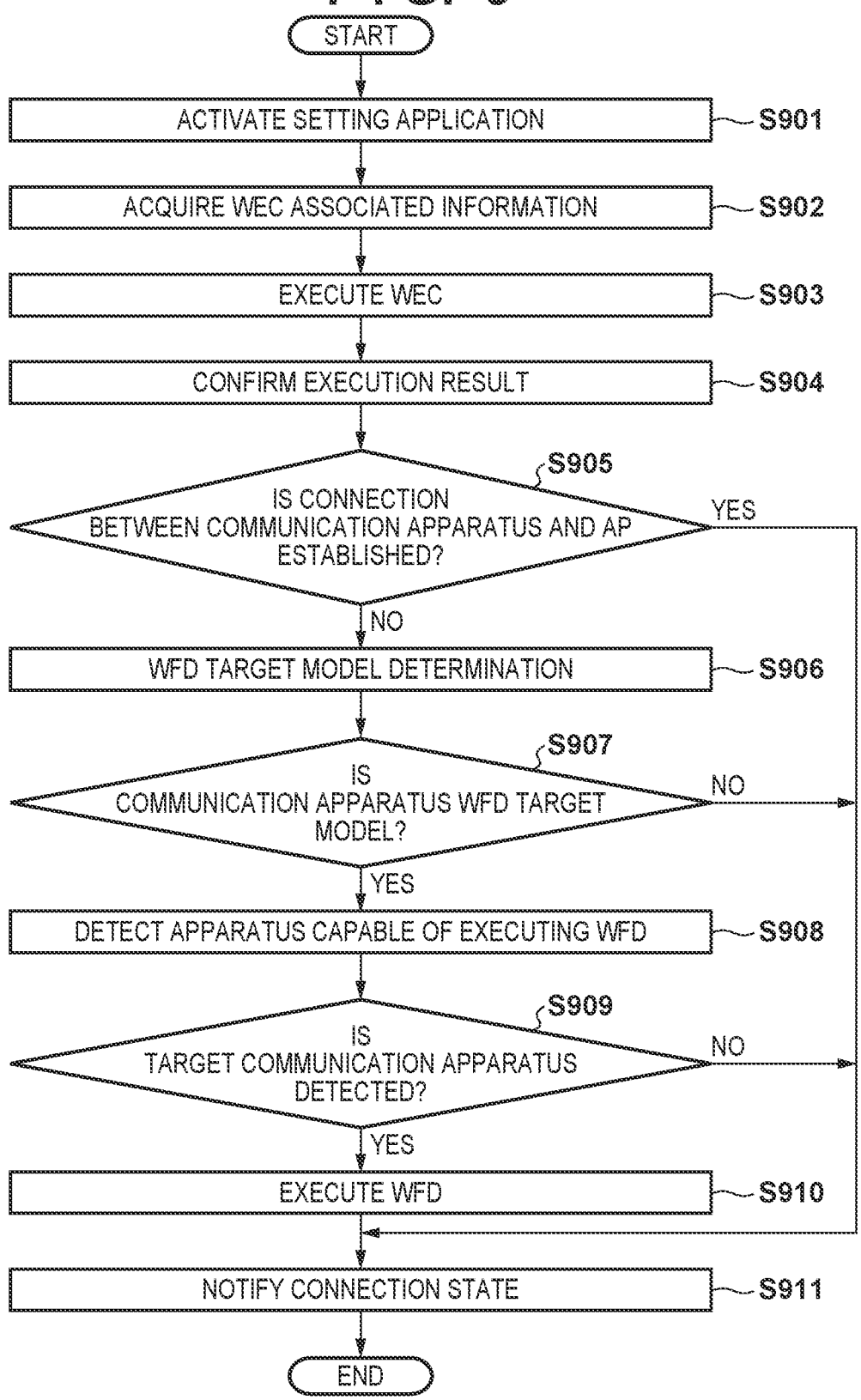

COMMUNICATION APPARATUS, CONTROL METHOD, AND SYSTEM

BACKGROUND OF THE INVENTION

Field of the Invention

The present invention relates to a communication apparatus, a control method, and a system.

Description of the Related Art

There is known a technique of connecting a communication apparatus such as a printer and an external apparatus using an information processing apparatus such as a personal computer (PC) or a smartphone. For example, a terminal apparatus described in Japanese Patent Laid-Open No. 2021-27378 determines whether the terminal apparatus is establishing wireless connection with an access point different from a communication apparatus, and upon determining that the terminal apparatus is establishing wireless connection with the access point, transmits Configuration Object that is connection information to the communication apparatus. Also, upon determining that the terminal apparatus is not establishing wireless connection with the access point, the terminal apparatus executes WFD connection processing and establishes wireless connection without intervention of an access point between a WFD terminal apparatus and the communication apparatus.

SUMMARY OF THE INVENTION

The present invention provides a technique of more reliably establishing wireless connection between a communication apparatus and another apparatus.

The present invention in one aspect provides a communication apparatus capable of communicating with an information processing apparatus, comprising: an execution unit configured to execute processing for causing the information processing apparatus to acquire first information used by the information processing apparatus for communication by a predetermined protocol with the communication apparatus; a reception unit configured to receive, using the communication by the predetermined protocol with the information processing apparatus that has acquired the first information, second information concerning an external access point outside the information processing apparatus and outside the communication apparatus; an attempt unit configured to attempt establishment of first wireless connection between the external access point and the communication apparatus using the second information; a start unit configured to start, based on a failure of the attempted establishment of the first wireless connection, an operation in a predetermined mode, in the communication apparatus, for establishing second wireless connection without intervention of the external access point between the information processing apparatus and the communication apparatus; and a connection unit configured to establish the second wireless connection after the start of the operation in the predetermined mode.

According to the present invention, it is possible to more reliably establish wireless connection between a communication apparatus and another apparatus.

Further features of the present invention will become apparent from the following description of exemplary embodiments with reference to the attached drawings.

BRIEF DESCRIPTION OF THE DRAWINGS

FIG. 2 is a sequence chart showing processing executed by the communication apparatus and the information processing apparatus;

FIG. 3 is a view showing an example of a screen for code image capturing displayed by a setting application;

FIG. 4 is a view showing an example of a WEC start screen displayed on the display unit of the information processing apparatus;

FIG. 5 is a view showing a confirmation screen displayed on the display unit of the communication apparatus;

FIG. 6 is a flowchart showing an example of processing of the communication apparatus;

FIG. 7 is a flowchart showing an example of processing of the communication apparatus;

FIG. 8 is a flowchart showing an example of processing of the communication apparatus; and FIG. 9 is a flowchart showing an example of processing of the information processing apparatus.

DESCRIPTION OF THE EMBODIMENTS

Figure 1:
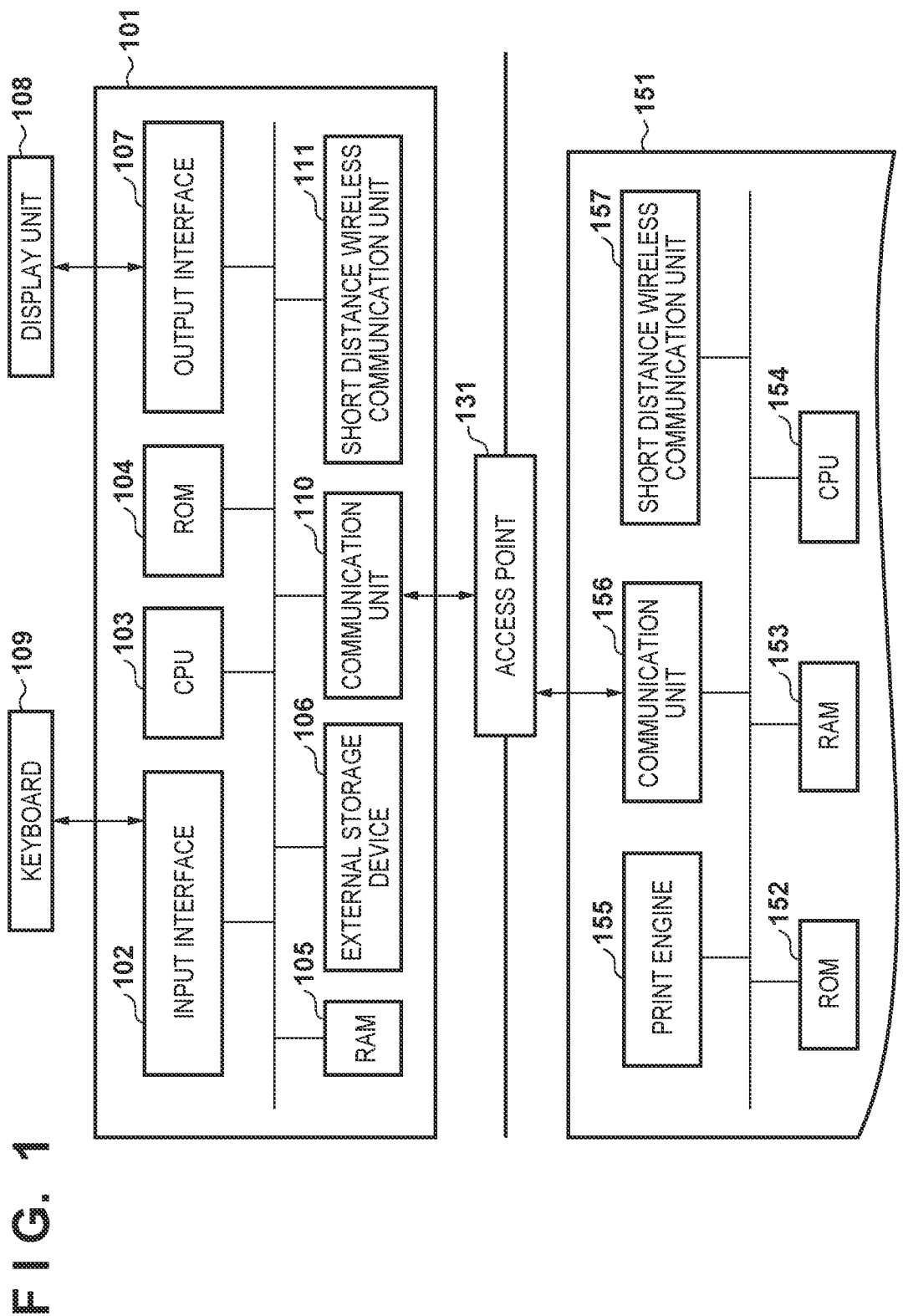
FIG. 1 is a view showing the configurations of an information processing apparatus, a communication apparatus, and an access point.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In the above-described conventional technique, if it is determined that wireless connection between a terminal apparatus and an access point is being established, wireless connection between a communication apparatus and the access point is established using communication by the Device Provisioning Protocol (DPP) between the terminal apparatus and the communication apparatus. However, processing in a case where the establishment of the wireless connection between the communication apparatus and the access point using the communication by DPP fails is not disclosed. Hence, there is room for improvement to more reliably establish connection between the communication apparatus and another apparatus.

According to the present disclosure, it is possible to more reliably establish wireless connection between a communication apparatus and another apparatus.

First Embodiment

An information processing apparatus and a communication apparatus included in a communication system according to this embodiment will be described first. In this embodiment, a smartphone is exemplified as the information processing apparatus, but the present invention is not limited to this. For example, as the information processing apparatus, various kinds of apparatuses such as a portable terminal, a Personal Computer (PC), a tablet terminal, a Personal Digital Assistant (PDA), and a digital camera are applicable.

In this embodiment, a printer is exemplified as the communication apparatus, but the present invention is not limited to this, and various kinds of apparatuses are applicable as long as they can perform wireless communication with the information processing apparatus. For example, concerning a printer, the present invention can be applied to an inkjet printer, a full-color laser beam printer, a monochrome printer, and the like. Furthermore, the present invention can be applied not only to a printer but also to a copying machine, a facsimile apparatus, a portable terminal, a smartphone, a laptop, a tablet terminal, a PDA, a digital camera, a music playback device, a television, a smart speaker, and the like. In addition, the present invention can be applied to a multi-function peripheral having a plurality of functions such as a copying function, a FAX function, and a print function.

In this embodiment, the information processing apparatus and the communication apparatus can execute wireless communication based on a standard such as Wi-Fi® (Wireless Fidelity). Wi-Fi® is a communication standard complying with the IEEE802.11 series.

In this embodiment, the information processing apparatus supports a function called Wi-Fi Easy Connect (to be referred to as WEC hereinafter). WEC is a function of executing network setup of another apparatus using the Device Provisioning Protocol (to be referred to as DPP hereinafter) formulated by the Wi-Fi Alliance. Note that more specifically, network setup of another apparatus is processing of connecting another apparatus to an access point that forms a network.

In WEC, communication is performed between a device (to be referred to as a Configurator device hereinafter) that operates as a "Configurator" and a device (to be referred to as an Enrollee device hereinafter) that operates as an "Enrollee". The Configurator device acquires Bootstrapping information from the Enrollee device. The Bootstrapping information includes, for example, the identification information (for example, the MAC address) of the Enrollee device, public key information used to perform secure communication with the Enrollee device, and the like.

In this embodiment, the Bootstrapping information will be described as "WEC associated information". Note that other pieces of information can also be handled as WEC associated information. The Configurator device executes wireless communication with the Enrollee device using the acquired Bootstrapping information. More specifically, for example, the Configurator device encrypts a protocol key using a public key included in the Bootstrapping information, and transmits the encrypted protocol key to the Enrollee device.

Then, the Configurator device then encrypts a common key based on the encrypted protocol key, and transmits information encrypted using the common key to the Enrollee device. Note that more specifically, the information transmitted here is, for example, connection information used to connect to an access point. Then, the Enrollee device establishes wireless communication with the access point using the connection information received from the Configurator device.

Note that the description will be made assuming that in network setup by WEC according to this embodiment, an information processing apparatus supporting WEC operates as a Configurator device, and a communication apparatus supporting WEC operates as an Enrollee device.

<System Configuration>

First, the configuration of a system 1 according to this embodiment, which includes an information processing apparatus 101 and a communication apparatus 151 communicable with the information processing apparatus 101 will be described with reference to a block diagram shown in FIG. 1. The configuration shown in FIG. 1 will be described below as an example. However, the functions are not limited to those shown in FIG. 1.

(Information Processing Apparatus)

The information processing apparatus 101 includes an input interface 102, a CPU 103, a ROM 104, a RAM 105, an external storage device 106, an output interface 107, a display unit 108, a communication unit 110, and a short distance wireless communication unit 111. The CPU 103, the ROM 104, the RAM 105, and the like form a computer of the information processing apparatus 101.

The input interface 102 is an interface for accepting data input and operation instructions from the user when an operation unit such as a keyboard 109 is operated. Note that the operation unit may include a physical keyboard and physical buttons, or may include a software keyboard and software buttons displayed on the display unit 108. That is, the input interface 102 may accept input from the user via the display unit 108.

The CPU 103 is a system control unit and controls the whole information processing apparatus 101.

The ROM 104 stores permanent data such as control programs to be executed by the CPU 103, data tables, and an embedded operating system (to be referred to as an OS hereinafter) program. In this embodiment, the control programs stored in the ROM 104 perform software execution control such as scheduling, task switch, and interrupt processing under the management of the embedded OS stored in the ROM 104.

The RAM 105 is formed by a Static Random Access Memory (SRAM) or the like, which needs a backup power supply. Note that the RAM 105 can store important data such as program control variables without volatilization because the data are held by a primary battery (not shown) for data backup. In addition, a memory area for storing setting information of the information processing apparatus 101, management data of the information processing apparatus 101, and the like is also provided in the RAM 105. Furthermore, the RAM 105 is also used as the main memory and the work memory of the CPU 103.

The external storage device 106 stores an application program (to be referred to as a setting application) configured to perform a network setup of the communication apparatus 151, a print information generation program that generates print information interpretable by the printing apparatus 151, and the like. In this embodiment, the setting application is an application program for setting an access point as the connection destination of the communication apparatus 151 by WEC or the like. Note that the setting application may have functions other than the network setup function. For example, the setting application may have a function of causing the communication apparatus 151 to execute printing, a function of scanning a document set on the communication apparatus 151, a function of confirming the state of the communication apparatus 151, and the like. The setting application is stored in the external storage device 106 by being installed from an external server by, for example, Internet communication via the communication unit 110. Furthermore, the external storage device 106 stores various kinds of programs such as an information transmission/reception control program to be transmitted/received to/from the communication apparatus 151 connected via the communication unit 110, and various kinds of information to be used by the programs.

The output interface 107 is an interface that performs control to cause the display unit 108 to display data or notify the state of the information processing apparatus 101.

The display unit 108 is formed by a Light-Emitting Diode (LED), a Liquid Crystal Display (LCD), or the like and displays data or notifies the state of the information processing apparatus 101.

The communication unit 110 is a component connected to an apparatus such as the communication apparatus 151 or an access point 131 to execute data communication. For example, the communication unit 110 can be connected to an access point (not shown) in the communication apparatus 151. If the communication unit 110 and the access point in the communication apparatus 151 are connected, the information processing apparatus 101 and the communication apparatus 151 can communicate with each other. Note that the communication unit 110 may directly communicate with the communication apparatus 151 by wireless communication, or may perform communication via an external apparatus existing outside the information processing apparatus 101 and the communication apparatus 151. Note that examples of the external apparatus include an external access point (the access point 131 or the like) existing outside the information processing apparatus 101 and the communication apparatus 151, and an apparatus, other than the access point, that can relay communication. In this embodiment, a wireless communication method used by the communication unit 110 is based on the standard of Wi-Fi®. WEC described above is executed by communication by the communication unit 110. In addition, for example, a device such as a wireless LAN router is used as the access point 131. Note that in this embodiment, the connection method of directly connecting the information processing apparatus 101 and the communication apparatus 151 without intervention of an external access point is called direct connection. In addition, the connection method of connecting the information processing apparatus 101 and the communication apparatus 151 via the external access point is called infrastructure connection.

The short distance wireless communication unit 111 is a component wirelessly connected to the apparatus such as the communication apparatus 151 in a short distance to execute data communication, and performs communication by a communication method different from that of the communication unit 110. The short distance wireless communication unit 111 can be connected to a short distance wireless communication unit 157 in the communication apparatus 151. As the communication method, for example, Near Field Communication (NFC), Bluetooth® Classic, Bluetooth Low Energy (BLE), a Wi-Fi Aware, or the like is used.

In this embodiment, the information processing apparatus 101 executes WEC by its OS based on a WEC execution instruction by the setting application.

(Communication Apparatus)

The communication apparatus 151 is a communication apparatus according to this embodiment. The communication apparatus 151 includes a ROM 152, a RAM 153, a CPU 154, a print engine 155, a communication unit 156, and the short distance wireless communication unit 157. The CPU 154, the ROM 152, the RAM 153, and the like form a computer of the communication apparatus 151.

The CPU 154 is a system control unit and controls the whole communication apparatus 151.

The ROM 152 stores permanent data such as control programs to be executed by the CPU 154, data tables, and an OS program. In this embodiment, the control programs stored in the ROM 152 perform software execution control such as scheduling, task switch, and interrupt processing under the management of the embedded OS stored in the ROM 152.

The RAM 153 is formed by an SRAM or the like, which needs a backup power supply. Note that the RAM 153 can store important data such as program control variables without volatilization because the data are held by a primary battery (not shown) for data backup. In addition, a memory area for storing setting information of the communication apparatus 151, management data of the communication apparatus 151, and the like is also provided in the RAM 153. Furthermore, the RAM 153 is used as the main memory and the work memory of the CPU 154, and functions as a reception buffer configured to temporarily store print information received from the information processing apparatus 101 or the like, or stores various kinds of information.

Note that a memory such as an external HDD or an SD card may be attached as an optional device to the communication apparatus 151, and information stored in the communication apparatus 151 may be stored in the memory.

Based on information stored in the RAM 153 or a print job received from the information processing apparatus 101 or the like, the print engine 155 forms an image on a print medium such as a paper sheet by applying a printing material such as ink onto the print medium, and outputs the print result. Note that in general, the data amount of the print job transmitted from the information processing apparatus 101 or the like is large, and thus it is required to use, for communication of the print job, a communication method that allows high-speed communication. Therefore, the communication apparatus 151 receives the print job via the communication unit 156 that can perform communication at a speed higher than that of the short distance wireless communication unit 157.

The communication unit 156 includes, as the access point in the communication apparatus 151, an access point for connection to the external apparatus such as the information processing apparatus 101. Note that the access point can be connected to the communication unit 110 of the information processing apparatus 101. If the communication unit 156 enables the access point, the communication apparatus 151 operates as the access point. Note that the communication unit 156 may directly, wirelessly be connected to the information processing apparatus 101 or may wirelessly be connected to the information processing apparatus 101 via the access point 131. In this embodiment, as the wireless communication method used by the communication unit 156, a communication standard based on the IEEE802.11 series is used. Also, in the following explanation, Wi-Fi® (Wireless Fidelity) is a communication standard based on the IEEE802.11 series. If the communication apparatus 151 supports WEC, WEC describe above is executed by communication by the communication unit 156. The communication unit 156 may include hardware functioning as an access point or may operate as an access point by software for functioning as an access point.

The communication apparatus 151 of this embodiment can operate in an infrastructure mode or a Peer-To-Peer (P2P) mode as a mode for performing communication using the communication unit 156.

The infrastructure mode is a mode in which the communication apparatus 151 communicates with another apparatus such as the information processing apparatus 101 via an external apparatus (for example, the access point 131) forming a network. That is, the infrastructure mode is a mode in which the communication apparatus 151 establishes infrastructure connection to the information processing apparatus 101 via the external access point (access point 131). In this embodiment, in the infrastructure connection, the communication apparatus 151 operates as a slave station and the external access point operates as a master station. Note that in this embodiment, the master station is an apparatus that decides a communication channel used in a network to which the master station belongs, and the slave station is an apparatus that does not decide a communication channel used in a network to which the slave station belongs, and uses the communication channel decided by the master station.

The P2P mode is a mode in which the communication apparatus 151 directly communicates with another apparatus such as the information processing apparatus 101 without intervention of an external apparatus forming a network. That is, the P2P mode is a mode in which the communication apparatus 151 establishes direct connection to the information processing apparatus 101 without intervention of the external access point (access point 131). In this embodiment, in the P2P mode, for example, the communication apparatus 151 may communicate with another apparatus by Wi-Fi Direct® (to be referred to as WFD hereinafter). Note that which of a plurality of WFD-capable apparatuses operates as a master station is decided in accordance with, for example, the Group Owner Negotiation procedure. The master station may be decided without executing the Group Owner Negotiation procedure. An apparatus that is a WFD-capable apparatus and serves as a master station is especially called a Group Owner. Other examples of the P2P mode are an AP mode and an ad hoc mode in which the communication apparatus 151 operates as an access point and performs communication by the normal Wi-Fi standard. The connection information (the SSID and the password) enabled in the communication apparatus 151 in the AP mode can arbitrarily be set by the user. In this embodiment, in the direct connection, the communication apparatus 151 operates as a master station and the other apparatus operates as a slave station.

In this embodiment, the communication apparatus 151 can also operate in a network setup mode in which network setup is performed. The network setup mode is a mode in which the communication apparatus 151 establishes infrastructure connection or direct connection to another apparatus. For example, if the communication apparatus 151 establishes infrastructure connection or direct connection to another apparatus in the network setup mode, the communication apparatus 151 can communicate with the other apparatus in the infrastructure mode or the P2P mode.

The network setup mode is executed in a case where, for example, the communication apparatus 151 that has not completed initialization yet is powered on, or a predetermined operation for network setup is performed for the communication apparatus 151 whose power is on.

As will be described later in detail, the network setup mode includes, as a mode to establish infrastructure connection, a WEC execution mode in which connection between the communication apparatus 151 and the access point 131 is attempted by WEC. In addition, the network setup mode includes, as a mode to establish direct connection, a WFD execution mode in which connection between the communication apparatus 151 and the information processing apparatus 101 is attempted by WFD.

In this embodiment, in the WEC execution mode, the communication apparatus 151 executes network setup using a predetermined communication protocol. In this embodiment, the predetermined communication protocol is the above-described DPP, and in the WEC mode, the communication apparatus 151 is in a DPP waiting state. In a state in which the communication apparatus 151 is operating in the DPP waiting state, if a network setup request by DPP is received from the information processing apparatus 101, network setup by DPP is executed, as will be described later. In other words, the DPP waiting state is a state in which the communication apparatus is waiting for a network setup request by DPP. Details will be described later (see FIG. 7).

The short distance wireless communication unit 157 is a component wirelessly connected to the apparatus such as the information processing apparatus 101 in a short distance, and can be connected to, for example, the short distance wireless communication unit 111 in the information processing apparatus 101. As the communication method, for example, NFC, Bluetooth Classic, BLE, Wi-Fi Aware, or the like is used.

<Connection Between Communication Apparatus and External Apparatus>

As described above, as the method of connecting the communication apparatus 151 and the information processing apparatus 101, infrastructure connection and direct connection can be used. In infrastructure connection, the communication apparatus 151 is connected to an external apparatus such as the information processing apparatus 101 via the access point 131. At this time, if the access point 131 can perform Internet communication, the communication apparatus 151 can execute Internet communication via the access point 131. Hence, the communication apparatus 151 can implement various kinds of functions using the Internet communication. On the other hand, in direct connection, connection between the communication apparatus 151 and the information processing apparatus 101 can be established without necessity of the access point 131. However, the communication apparatus 151 cannot execute Internet communication, unlike infrastructure connection. Hence, when infrastructure connection is preferentially established, the convenience of the communication apparatus 151 can be improved. Also, it is considered that establishment of infrastructure connection is performed by WEC, as described above. However, even if the establishment of infrastructure connection fails, connection between the communication apparatus 151 and the information processing apparatus 101 needs to be ensured.

In this embodiment, to establish infrastructure connection between the communication apparatus 151 and the information processing apparatus 101, the information processing apparatus 101 attempts to establish connection between the communication apparatus 151 and the access point 131 by WEC. If the establishment of connection between the communication apparatus 151 and the access point 131 fails, direct connection is attempted between the information processing apparatus 101 and the communication apparatus 151.

<Example of Sequence of Information Processing Apparatus and Communication Apparatus>

FIG. 2 is a sequence chart showing processing executed by the communication apparatus 151 and the information processing apparatus 101. FIG. 2 shows an example of processing in a case where network setup processing of the communication apparatus 151 is performed using the information processing apparatus 101. More specifically, FIG. 2 shows an example of processing in a case where the information processing apparatus 101 attempts to establish connection between the communication apparatus 151 and the access point 131 by WEC, and if it fails, attempts to do direct connection to the communication apparatus 151 by WFD. The sequence shown in FIG. 2 is implemented by, for example, the CPU of each apparatus reading out a program stored in the ROM of each apparatus or an external storage device to the RAM of each apparatus and executing the program. At the start of this sequence, connection between the information processing apparatus 101 and the access point 131 is already established.

(WEC Connection Processing)

In S201, the communication apparatus 151 starts the WEC execution mode. As will be described later in detail, the communication apparatus 151 generates WEC associated information (Bootstrapping information). The communication apparatus 151 is then set in the DPP waiting state, and displays, on a display unit, a code such as a QR Code® used to provide the generated WEC associated information to the information processing apparatus 101 (see FIG. 7). In other words, the communication apparatus 151 is set in a state in which the WEC associated information can be provided to the information processing apparatus 101. The code displayed on the display unit here may be a two-dimensional code such as a QR Code®, or may be another code such as a barcode.

In S202, the user operates the information processing apparatus 101 to activate the above-described setting application. The setting application displays a screen for code image capturing on the display unit 108 of the information processing apparatus 101. FIG. 3 shows an example of the screen for code image capturing displayed by the setting application. A frame 301 is displayed on a screen 300 for code image capturing, and an image captured by a camera unit provided on the information processing apparatus 101 is displayed on the screen 300.

In S203, the user operates the information processing apparatus 101 to execute reading of the code displayed on the display unit of the communication apparatus 151. The user operates the information processing apparatus 101 such that the code displayed by the communication apparatus 151 and captured by the camera unit of the information processing apparatus 101 is fitted in the frame 301 on the screen 300. Upon detecting that the code is fitted in the frame 301, the setting application analyzes the code and acquires the WEC associated information (S204). The setting application holds the acquired WEC associated information in, for example, the RAM 105. Note that the screen 300 for code image capturing may be displayed by an application program (for example, an image capturing application program) that is not the setting application. The WEC associated information acquisition method is not limited to the method of capturing a code. For example, the WEC associated information may be acquired from the communication apparatus 151 by communication such as Bluetooth Classic, BLE, NFC, or Wi-Fi.

In S205, the setting application of the information processing apparatus 101 issues a WEC execution instruction to the OS of the information processing apparatus 101. Note that the setting application provides, to the OS, not only the WEC execution instruction but also the WEC associated information acquired in S204.

Upon accepting the WEC execution instruction from the setting application, the OS executes a predetermined program, thereby implementing the following processing. Note that the predetermined program is a program installed in advance in the information processing apparatus 101, and is a program provided by the OS vendor of the information processing apparatus 101.

In S206, the OS displays a WEC start screen on the display unit 108 and confirms with the user whether to execute WEC. FIG. 4 shows an example of the WEC start screen displayed on the display unit 108 of the information processing apparatus 101. Regions 401, 402, and 403 are displayed on a WEC start screen 400. The region 401 is a region configured to change an access point set as a setting target of WEC. Note that the access point set as the setting target of WEC before the region 401 is operated is the access point currently connected to the information processing apparatus 101. If the region 401 is selected, the information processing apparatus 101 displays a list of access points, and sets an access point selected from the list by the user newly as the setting target of WEC. Note that the list of access points includes, for example, access points that the information processing apparatus 101 has found by AP search and access points to which the information processing apparatus 101 has been connected once. The region 402 is a region used to cancel execution of WEC, and the region 403 is a region used to instruct execution of WEC.

If the region 403 is selected by the user, that is, if a WEC execution permission from the user is accepted (S207), the OS advances to DPP connection processing from S208. On the other hand, if the region 402 is selected, the OS ends the processing of this sequence chart or transitions to WFD connection processing to be described later.

In S208, processing called DPP Authentication is executed between the information processing apparatus 101 and the communication apparatus 151 by the function of the OS of the information processing apparatus 101. In the DPP Authentication, authentication information and information used to encrypt information are communicated between the information processing apparatus 101 and the communication apparatus 151, thereby authenticating communication between the apparatuses. Note that various kinds of information transmitted from the information processing apparatus 101 in the communication of DPP Authentication are encrypted based on the WEC associated information acquired in S204. More specifically, in the DPP Authentication, first, the information processing apparatus 101 transmits, to the communication apparatus 151, an Authentication Request as a network setup request by DPP. The communication apparatus 151 in the DPP waiting state is operating in a state capable of waiting for the Authentication Request and thus receives the Request transmitted from the information processing apparatus 101. Upon receiving the Authentication Request, the communication apparatus 151 attempts to decrypt the received Request using a decryption key currently held by the communication apparatus. If the decryption succeeds, the communication apparatus 151 transmits an Authentication response to the information processing apparatus 101, thereby authenticating communication with the information processing apparatus 101.

Note that if the information processing apparatus 101 cannot acquire correct WEC associated information, and the information cannot correctly be encrypted, decryption by the communication apparatus 151 fails. For this reason, authentication fails, and the Authentication response is not transmitted. When the information processing apparatus 101 receives the Authentication response, the DPP Authentication is completed. Also, in the DPP Authentication, communication is executed using DPP.

In S209, processing called DPP Configuration is executed between the information processing apparatus 101 and the communication apparatus 151 by the function of the OS of the information processing apparatus 101. In the DPP Configuration, the information processing apparatus 101 transmits connection information used to connect the access point set as the setting target of WEC to the communication apparatus 151 by DPP. Note that the connection information includes information representing the SSID, the password, and the encryption method of the access point set as the setting target of WEC.

The password transmitted at this time is information input by the user on a screen displayed by an application supporting the OS when the connection between the information processing apparatus 101 and the access point is established. This is information held by the OS when the connection between the information processing apparatus 101 and the access point is established. Also, the password is information that the setting application does not hold. Since the password transmitted at this time is information already held by the OS, and the DPP Configuration is processing executed by the OS, the password need not newly be input by the user on the screen displayed by the setting application. When the connection information is transmitted by WEC, as in this embodiment, the password can be transmitted to the communication apparatus 151 by secure communication without newly accepting input of the password from the user on the screen displayed by the setting application. Note that even in the DPP Configuration, communication is executed using DPP.

Note that in this embodiment, communication in the DPP Authentication and the DPP Configuration is performed by beacon transmission of each apparatus. Also, in this embodiment, in the DPP Authentication and the DPP Configuration, the communication apparatus 151 receives a beacon transmitted from the information processing apparatus 101 by a network interface for infrastructure connection.

In S210, the communication apparatus 151 attempts connection to the access point 131 (an external access point different from the information processing apparatus 101 and the communication apparatus 151). More specifically, using the connection information acquired by WEC, the communication apparatus 151 attempts connection to the access point 131 corresponding to the connection information. If connection is established, the communication apparatus 151 can execute communication via a network formed by the connected access point 131 from then on. Note that the communication via the network formed by the connected access point is executed by a protocol (more specifically, for example, Port 9100, SNMP, or a protocol unique to the vendor of the communication apparatus 151) different from DPP.

In S211, the communication apparatus 151 notifies the OS of the information processing apparatus 101 of the attempt result of connection in S210, that is, information representing whether connection to the access point 131 corresponding to the connection information acquired by WEC succeeds or not. Note that if connection to the access point corresponding to the connection information acquired by WEC fails, the communication apparatus 151 may transmit information representing the cause of the failure to the information processing apparatus 101. The information transmission may be executed using DPP. Note that the connection to the access point corresponding to the connection information acquired by WEC fails because a communication error occurs in WEC, the access point cannot be found, or the WEC associated information acquired from the communication apparatus 151 is not appropriate information. The connection fails also because, for example, the encryption method used to connect to the access point set as the setting target of WEC is an encryption method that the communication apparatus 151 does not support. The connection fails also because, for example, the encryption method used to connect to the access point set as the setting target of WEC is an encryption method that WEC does not support.

In S212, the OS of the information processing apparatus 101 notifies the setting application of the attempt result of connection in S210, that is, information representing whether connection to the access point 131 corresponding to the connection information acquired by WEC succeeds or not.

Note that if connection between the communication apparatus 151 and the access point 131 is established in S210, connection via the access point 131 is established between the information processing apparatus 101 and the communication apparatus 151, and after that, the sequence is ended. More specifically, based on the end of execution of WEC, the information processing apparatus 101 causes the setting application to operate in the foreground. Then, the information processing apparatus 101 searches for the communication apparatus 151 on the network to which the information processing apparatus 101 itself belongs. This processing is implemented by the setting application that has received, from the OS in S212, a notification representing that connection between the communication apparatus 151 and the access point 131 is established. If the communication apparatus 151 is found, the information processing apparatus 101 requests capability information from the communication apparatus 151, and the communication apparatus 151 transmits the capability information to the information processing apparatus 101. Hence, the information of the communication apparatus 151 is registered on the setting application, and communication with the communication apparatus 151 can be executed by the setting application from then on. More specifically, for example, a print job can be transmitted to the communication apparatus 151 by the setting application. Note that at this time, if the information processing apparatus 101 belongs to the network formed by the access point 131 to which the communication apparatus 151 is connected by WEC, communication with the communication apparatus 151 can be executed via the access point 131. Also, if communication between the information processing apparatus 101 and the communication apparatus 151 cannot be executed because, for example, the access point to which the communication apparatus 151 is connected is not the access point 131 to which the information processing apparatus 101 is connected, the request or acquisition of capability information is omitted. Note that the communication here is executed using, for example, a communication protocol (more specifically, for example, CHMP) different from DPP. After that, the information processing apparatus 101 ends the processing shown in the sequence chart.

(WFD Connection Processing)

Processing in a case where establishment of connection between the communication apparatus 151 and the access point 131 by WEC fails, that is, in a case where establishment of infrastructure connection between the information processing apparatus 101 and the communication apparatus 151 fails will be described next.

In S213, the communication apparatus 151 ends the DPP waiting state and ends the WEC execution mode.

In S214, the communication apparatus 151 starts the WFD execution mode. More specifically, the communication apparatus 151 broadcasts a beacon based on the Wi-Fi standard at a predetermined time interval such that the information processing apparatus 101 can detect the communication apparatus 151 in the processes of S216 and S217 to be described later. This beacon includes, for example, the MAC address of the communication apparatus 151.

On the other hand, in S215, the setting application of the information processing apparatus 101 executes WFD target model determination. More specifically, the setting application determines whether the communication apparatus 151 can perform direct connection by WFD. As an example, the setting application determines, based on the MAC address (identification information) of the communication apparatus 151 included in the WEC associated information (Bootstrapping information) held in the RAM 105 or the like, whether the communication apparatus can perform direct connection by WFD. For example, if the MAC address is assigned as a character string capable of specifying the model of the communication apparatus 151, the setting application can specify the model of the communication apparatus 151 from the acquired MAC address. In addition, when the setting application holds, in advance, information that links a settable apparatus model and whether the model can perform direct connection by WFD, it is possible to determine whether the model specified based on the MAC address can perform direct connection by WFD. In this way, the setting application can determine, based on the information acquired in the WEC connection processing, whether the communication apparatus 151 can perform direct connection by WFD. Note that a mode in which the model information of the communication apparatus 151 or the information representing whether direct connection by WFD is possible or not itself is included in the Bootstrapping information can also be employed.

The following description will be made assuming that the communication apparatus 151 is the WFD target model. Otherwise, the sequence is ended here.

In S216, the setting application of the information processing apparatus 101 instructs the OS of the information processing apparatus 101 to detect WFD apparatuses. In S217, the OS provides a WFD apparatus list as a detection result to the setting application. More specifically, the OS receives a beacon broadcast by a peripheral apparatus based on the Wi-Fi standard, thereby detecting the apparatus that is the transmission source of the received beacon. The OS then lists detected apparatuses and provides these as a WFD apparatus list to the setting application. The WFD apparatus list includes information such as the MAC address of each detected apparatus. Note that the setting application of the information processing apparatus 101 may omit the determination of S215, advance from S214 to S216, and execute WFD target model determination based on the information acquired in S216. More specifically, it may be determined whether a MAC address that matches the MAC address included in the Bootstrapping information is included in the WFD apparatus list, thereby executing WFD target model determination. If the communication apparatus 151 is the WFD target model, the process advances to S218. If the communication apparatus 151 is not the WFD target model, the sequence is ended.

In S218, the setting application determines whether the communication apparatus 151 that has attempted WEC exists in the acquired WFD apparatus list. For example, the setting application determines the existence of the communication apparatus 151 by determining whether the MAC address of the communication apparatus 151 included in the WEC associated information (Bootstrapping information) acquired in the WEC connection processing is included in the WFD apparatus list acquired in S217. The following description will be made assuming that the communication apparatus 151 is included in the WFD apparatus list. Otherwise, the sequence is ended here.

In S219, the setting application transmits a WFD connection request to the communication apparatus 151. In S220, a confirmation screen concerning whether the communication apparatus 151 executes direct connection (here, WFD connection) is displayed. FIG. 5 shows an example of a confirmation screen displayed on the display unit of the communication apparatus 151. Regions 501 and 502 are displayed on a confirmation screen 500. The region 501 is a region configured to instruct not to execute direct connection to the information processing apparatus 101. The region 502 is a region configured to instruct to execute direct connection to the information processing apparatus 101.

In S221, if the user inputs a permission via the screen of the communication apparatus 151, WFD connection processing executed in S222. Note that here, the user is made to operate the screen of the communication apparatus 151, thereby confirming the user's intention for connection. However, this intention confirmation may be done by displaying a PIN code on the communication apparatus 151 and causing the user to input the PIN code on the setting application. A known technique can be used for the WFD connection processing itself, and a description thereof will be omitted here.

According to the above-described sequence, since infrastructure connection is preferentially executed for connection between the information processing apparatus 101 and the communication apparatus 151, the convenience of the communication apparatus 151 can be improved. If infrastructure connection cannot be established, that is, if establishment of connection between the communication apparatus 151 and the access point 131 fails, direct connection is established between the information processing apparatus 101 and the communication apparatus 151, and therefore, connection between these can be ensured.

Also, in this embodiment, infrastructure connection is established by WEC. At this time, the communication apparatus 151 accepts information about the access point 131 from the information processing apparatus 101 by DPP, and attempts connection to the access point 131 using the accepted information. Hence, the user need not input information such as the SSID and the password of the access point 131 in connection between the communication apparatus 151 and the access point 131, and user's labor can be reduced.

<Example of Processing of Communication Apparatus>

FIG. 6 is a flowchart showing an example of processing of the communication apparatus 151 when executing the sequence shown in FIG. 2. The flowchart shown in FIG. 6 is implemented by, for example, the CPU 154 reading out a program stored in the ROM 152 or a memory to the RAM 153 and executing the program.

In step S601, the communication apparatus 151 starts the WEC execution mode (corresponding to S201 in FIG. 2). Here, FIG. 7 is a flowchart showing the contents of processing at the start of the WEC execution mode. The flowchart shown in FIG. 7 is implemented by, for example, the CPU 154 reading out a program stored in the ROM 152 or a memory to the RAM 153 and executing the program. The flowchart shown in FIG. 7 is executed when, for example, the communication apparatus 151 starts network setup processing.

In step S701, the CPU 154 decides a waiting channel of DPP communication. The waiting channel of DPP communication means a channel that waits for a network setup request by DPP, which is transmitted from the information processing apparatus 101. The same channel is used in the DPP Configuration processing. Note that which channel is used as the waiting channel of DPP communication may be set, for example, by the user from the operation screen of the communication apparatus 151.

In step S702, the CPU 154 generates the above-described public key information used to perform secure communication with the information processing apparatus 101.

In step S703, the CPU 154 generates the above-described Bootstrapping information. The Bootstrapping information includes, for example, the identification information (the MAC address or the like) of the communication apparatus 151, information about the waiting channel of the DPP communication, and the public key information generated in step S702. Also, the Bootstrapping information may include information concerning whether the communication apparatus 151 can execute connection processing by WFD.

In step S704, the CPU 154 starts the DPP waiting state. If the DPP waiting state is started, communication in the DPP Authentication can be performed between the communication apparatus 151 and the information processing apparatus 101.

Also, in this embodiment, in the DPP waiting state, the communication apparatus 151 waits in a state in which it can provide the Bootstrapping information (WEC associated information) generated in step S703 to the information processing apparatus 101. Here, the communication apparatus 151 displays a code such as a QR Code® corresponding to the WEC associated information on the display unit, and the information processing apparatus 101 reads the code by the camera unit or the like, thereby providing the WEC associated information from the communication apparatus 151 to the information processing apparatus 101. Note that as described above, providing of the WEC associated information from the communication apparatus 151 to the information processing apparatus 101 may be done by, for example, communication performed between the short distance wireless communication unit 157 of the communication apparatus 151 and the short distance wireless communication unit 111 of the information processing apparatus 101 using NFC, Bluetooth Classic, BLE, Wi-Fi, or the like.

In step S705, the CPU 154 activates a timer for timeout of the DPP waiting state. Note that if a predetermined time elapses from the start of the operation in the DPP waiting state, the CPU 154 stops the operation in the DPP waiting state, as will be described later in detail. This is because the possibility that network setup using DPP does not succeed is high if communication with the information processing apparatus 101 cannot be performed by DPP even after waiting for a predetermined time. Hence, if a predetermined time elapses from the start of the DPP waiting state, determining that establishment of connection to the access point 131 by WEC fails, the CPU 154 stops the operation in the DPP waiting state and transitions to connection processing by WFD.

Referring back to FIG. 6, in step S602, the communication apparatus 151 executes WEC (corresponding to S208 to S210 in FIG. 2). In step S603, the communication apparatus 151 notifies the information processing apparatus 101 of the WEC execution result (corresponding to S211 in FIG. 2). FIG. 8 is a flowchart showing WEC execution processing. FIG. 8 shows the operation of the communication apparatus 151 in S208 to S210 of FIG. 2 more specifically. The flowchart shown in FIG. 8 is implemented by, for example, the CPU 154 reading out the setting application stored in the ROM 152 or a memory to the RAM 153 and executing the setting application.

In step S801, the CPU 154 executes DPP Authentication processing. As described above, in the DPP Authentication processing, authentication information and information used to encrypt information are communicated between the information processing apparatus 101 and the communication apparatus 151, thereby authenticating communication between the apparatuses. Note that in the DPP Authentication, communication is executed using DPP.

In step S802, the CPU 154 determines whether the DPP Authentication processing with the information processing apparatus 101 succeeds. As described above, various kinds of information transmitted from the information processing apparatus 101 in the communication of DPP Authentication are encrypted based on the WEC associated information acquired by the information processing apparatus 101 in the processing shown in FIG. 2. If the information received from the information processing apparatus 101 is successfully decoded by a decryption key held in advance, the CPU 154 authenticates the communication with the information processing apparatus 101. Note that if the information processing apparatus 101 cannot acquire correct WEC associated information, and the information cannot correctly be encrypted, decryption by the communication apparatus 151 fails. For this reason, authentication fails. Hence, if the authentication of communication with the information processing apparatus 101 succeeds, the CPU 154 determines that the DPP Authentication processing succeeds. If the authentication fails, the CPU 154 determines that the DPP Authentication processing fails. If NO in step S802, the CPU 154 ends the flowchart. On the other hand, if YES in step S802, the CPU 154 advances to step S803.

In step S803, the CPU 154 executes DPP Configuration processing. In the DPP Configuration processing, the CPU 154 receives connection information used to connect to an access point set as the setting target of WEC from the information processing apparatus 101 by WEC. Note that the connection information includes information representing the SSID, the password, and the encryption method of the access point set as the setting target of WEC.

In step S804, the CPU 154 determines whether the DPP Configuration processing with the information processing apparatus 101 succeeds. More specifically, if the connection information used to connect to the access point set as the setting target of WEC is received from the information processing apparatus 101 by WEC, the CPU 154 determines that the DPP Configuration processing succeeds. If the connection information cannot be received, the CPU 154 determines that the DPP Configuration processing fails. If NO in step S804, the CPU 154 ends the flowchart. On the other hand, if YES in step S804, the CPU 154 advances to step S805. Note that if the DPP Configuration processing succeeds, the CPU 154 acquires the SSID, the encryption method, and the password of the access point.

In step S805, the CPU 154 determines whether an SSID is included in the information of the access point set as the setting target of WEC, which is received from the information processing apparatus 101. If NO in step S805, the CPU 154 ends the flowchart. On the other hand, if YES in step S805, the CPU 154 advances to step S806.

In step S806, the CPU 154 determines whether an encryption method is included in the information of the access point set as the setting target of WEC, which is received from the information processing apparatus 101. If NO in step S806, the CPU 154 ends the flowchart. On the other hand, if YES in step S806, the CPU 154 advances to step S807.

In step S807, the CPU 154 determines whether a password is included in the information of the access point set as the setting target of WEC, which is received from the information processing apparatus 101. Note that if the communication apparatus is connected to the access point using DPP communication, the CPU 154 may determine whether not a password but public key information is included. If NO in step S807, the CPU 154 ends the flowchart.

In step S808, the CPU 154 connects to the access point using the various kinds of information (the SSID, the password, and the encryption method) of the access point set as the setting target of WEC, which is received from the information processing apparatus 101. The CPU 154 then ends the flowchart.

Referring back to FIG. 6, in step S604, if connection to the access point 131 is established as the result of execution of step S602, the flowchart is ended. If establishment of connection fails, the process advances to step S604. Note that at this time, the CPU 154 transmits information representing whether connection to the access point 131 is established or not as the result of execution of step S602 (in other words, whether connection to the access point 131 succeeds or fails) to the information processing apparatus 101 by a beacon or the like. This processing corresponds to the process of S211. Also, if connection to the access point 131 is established as the result of execution of step S602, the CPU 154 may end the WEC execution mode.

In step S605, the communication apparatus 151 ends the DPP waiting state and ends the WEC execution mode (corresponding to S213 in FIG. 2). In step S606, the communication apparatus 151 starts the WFD mode (corresponding to S214 in FIG. 2). In step S606, the communication apparatus 151 executes WFD (corresponding to S220 and S222 in FIG. 2).

According to the communication apparatus 151 of this embodiment, since establishment of connection to the access point 131 by WEC (that is, establishment of infrastructure connection to the information processing apparatus 101) is preferentially attempted, the convenience in establishing connection to the information processing apparatus 101 can be improved. If establishment of connection to the access point 131 by WEC fails, direct connection to the information processing apparatus 101 is established. Hence, connection between these can be ensured.

In this embodiment, if establishment of connection to the access point 131 by WEC fails, the communication apparatus 151 ends the WEC execution mode and then starts the WFD execution mode. That is, the WEC execution mode and the WFD execution mode are not concurrently activated. Hence, even in a case where there is a constraint on concurrent activation of these modes due to the specifications of the chip set of the communication apparatus 151, or the like, if establishment of connection to the access point 131 by WEC fails, connection to the information processing apparatus 101 can be established. More specifically, even if the communication apparatus 151 can only selectively execute the WEC execution mode and the WFD execution mode, infrastructure connection is preferentially executed, and if infrastructure connection cannot be established, direct connection can be established.

Note that in this embodiment, if connection between the communication apparatus 151 and the access point 131 is not established in step S604, the communication apparatus 151 ends the WEC execution mode and starts the WFD execution mode. However, if connection between the communication apparatus 151 and the access point 131 is not established because of a predetermined factor, the communication apparatus 151 may end the WEC execution mode and start the WFD execution mode. The predetermined factor may be a communication error in which, for example, communication is interrupted in the communication between the information processing apparatus 101 and the communication apparatus 151 by DPP. Also, the predetermined factor may be an authentication error in which, for example, authentication needed to perform communication between the information processing apparatus 101 and the communication apparatus 151 by DPP fails. The predetermined factor may be the elapse of a predetermined time in the DPP waiting state of the communication apparatus 151. If connection between the communication apparatus 151 and the access point 131 is not established because of these factors, the possibility that connection fails again even if connection is reattempted may be high. Hence, in this case, infrastructure connection by WEC is abandoned, and infrastructure connection by WFD is established. On the other hand, if connection between the communication apparatus 151 and the access point 131 is not established due to another factor, the possibility that connection can be established by reattempt may be high, as compared to the above-described case. Hence, in this case, connection between the communication apparatus 151 and the access point 131 is reattempted a predetermined number of times. If connection cannot be established yet, connection by WFD may be established.

<Example of Processing of Information Processing Apparatus>

FIG. 9 is a flowchart showing an example of processing of the information processing apparatus 101 when executing the sequence shown in FIG. 2. The flowchart shown in FIG. 9 is implemented by, for example, the CPU 103 reading out a program stored in the ROM 104 or a memory to the RAM 105 and executing the program.

In step S901, the information processing apparatus 101 activates the setting application (corresponding to S202 in FIG. 2). In step S902, the information processing apparatus 101 acquires WEC associated information (corresponding to S204 in FIG. 2). In step S903, the information processing apparatus 101 executes WEC (corresponding to S205 to 210 in FIG. 2). In step S904, the information processing apparatus 101 confirms the WEC execution result (corresponding to S212 in FIG. 2).

If connection between the communication apparatus 151 and the access point 131 can be established in step S905 based on the contents confirmed in step S904, the information processing apparatus 101 advances to step S911. Otherwise, the information processing apparatus 101 advances to step S906. That is, upon detecting that connection between the communication apparatus 151 and the access point 131 by WEC is not established, the information processing apparatus 101 executes processing from step S906 to establish direct connection to the communication apparatus 151.

In step S906, the information processing apparatus 101 executes WFD target model determination (corresponding to S215 in FIG. 2). If the communication apparatus 151 is the WFD target model in step S907, the information processing apparatus 101 advances to step S908. Otherwise, the information processing apparatus 101 advances to step S911. If the communication apparatus 151 is not the WFD target model, processes after steps S908 to S910 cannot be executed, and therefore, the information processing apparatus 101 omits these processes.

In step S908, the information processing apparatus 101 detects an apparatus capable of executing WFD (corresponding to S216 and S217 in FIG. 2). If the communication apparatus 151 as the target can be detected in step S909, the information processing apparatus 101 advances to step S910. Otherwise, the information processing apparatus 101 advances to step S911 (corresponding to S218 in FIG. 2). Note that if the communication apparatus 151 cannot be detected, the information processing apparatus 101 may wait for a predetermined time and then perform the process of step S908 again. If the communication apparatus 151 cannot be detected even if the process of step S908 is executed a predetermined number of times or for a predetermined time, the information processing apparatus 101 may advance to step S911. That is, the information processing apparatus 101 may wait for a predetermined time until the communication apparatus 151 becomes detectable by the information processing apparatus 101. As shown in FIG. 2, transition from the WEC execution mode to the WFD execution mode in the communication apparatus 151 (S213 and S214) and WFD target model determination and detection of an apparatus capable of executing WFD in the information processing apparatus 101 are concurrently executed. Hence, when the information processing apparatus 101 waits for a predetermined time, even if time is needed to transition to the WFD mode on the side of the communication apparatus 151, the information processing apparatus 101 can detect the communication apparatus 151.

In step S910, the information processing apparatus 101 executes WFD (corresponding to S219 to S222 in FIG. 2). In step S911, the information processing apparatus 101 notifies the connection state. In accordance with the connection state to the communication apparatus 151, the information processing apparatus 101 makes a notification, for example, "infrastructure connection to the communication apparatus is established", "direct connection to the communication apparatus is established", or "connection to the communication apparatus has failed".

According to the information processing apparatus 101 of this embodiment, upon detecting that connection between the communication apparatus 151 and the access point 131 is not established by WEC, the state transitions to a state in which direct connection to the communication apparatus 151 can be performed. Hence, even if connection between the communication apparatus 151 and the access point 131 is not established by WEC, connection between the information processing apparatus 101 and the communication apparatus 151 can be established. In addition, if connection between the communication apparatus 151 and the access point 131 is not established by WEC, direct connection between the information processing apparatus 101 and the communication apparatus 151 is established without requiring a user operation. Hence, labor of the user operation can be reduced. However, if connection between the communication apparatus 151 and the access point 131 is not established by WEC, intention confirmation may be done to confirm whether to perform direct connection. For example, if NO in step S905, the information processing apparatus 101 may display a confirmation screen configured to confirm whether to perform direct connection to the communication apparatus 151 on the display unit 108 before advancing to step S906.

Also, according to this embodiment, the information processing apparatus 101 specifies, based on the information (WEC associated information) acquired when executing WEC, whether the communication apparatus 151 is included in the acquired WFD apparatus list (S218 and step S909). Hence, the user need not search for and select the communication apparatus 151 (the apparatus that has failed in connection to the access point 131 by WEC) from the WFD apparatus list. It is therefore possible to improve convenience in network setup.

Note that a configuration that omits the process of step S906 (S218) can also be employed. In this case, if the communication apparatus 151 is not the WFD target model, the communication apparatus 151 is not included in the WFD apparatus list, and the communication apparatus 151 cannot be detected in step S909 (S218). For this reason, direct connection by WFD is not executed. Hence, even in this configuration, if the communication apparatus 151 can execute direct connection by WFD, direct connection by WFD can be established between the information processing apparatus 101 and the communication apparatus 151.

Other Embodiments

A form has been described above in which establishment of connection between the communication apparatus 151 and the access point 131 is attempted by WEC, and if it fails, direct connection to the communication apparatus 151 that operates in the WFD mode is attempted. However, in each process in which the WFD mode is used above, another P2P mode such as an AP mode or an ad hoc mode may be used in place of the WFD mode. Also, for example, if the AP mode is used, WFD target model determination can be omitted. In addition, when acquiring WEC associated information, connection information (an SSID and a password) used to connect to the communication apparatus 151 that operates in the AP mode is also acquired. The connection information is used when establishing connection between the information processing apparatus 101 and the communication apparatus 151 that operates in the AP mode.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-076223, filed May 2, 2022, which is hereby incorporated by reference herein in its entirety.

What is claimed is:

1. A communication apparatus capable of communicating with an information processing apparatus, comprising:

a first operation start unit configured to start, in the communication apparatus, an operation in a first mode for waiting for a request of a network setup via a communication by a Device Provisioning Protocol (DPP) from the information processing apparatus, the first mode being as a network setup mode in which the network setup is for causing the communication apparatus to connect with an external access point outside the information processing apparatus and outside the communication apparatus;
a reception unit configured to receive connection information for connecting with the external access point via the communication by the DPP, in a case where the request of the network setup is accepted from the information processing apparatus that has acquired Bootstrapping information;
an attempt unit configured to attempt establishment of first wireless connection between the external access point and the communication apparatus using the connection information;
a second operation start unit configured to end the operation in the first mode in the communication apparatus, based on a failure of the attempted establishment of the first wireless connection, and start an operation in a second mode for establishing second wireless connection by Wi-Fi DIRECT (WFD) without intervention of the external access point between the information processing apparatus and the communication apparatus, the second mode being as the network setup mode; and
a connection unit configured to establish the second wireless connection after the start of the operation in the second mode.

2. The apparatus according to claim 1, further comprising:
an execution unit configured to execute processing for causing the information processing apparatus to acquire the Bootstrapping information,
wherein
the processing for causing the information processing apparatus to acquire the Bootstrapping information is processing of displaying, on a display unit of the communication apparatus, a code that corresponds to the Bootstrapping information and is readable by the information processing apparatus, and
if the code is read by the information processing apparatus, the Bootstrapping information is acquired by the information processing apparatus.

3. The apparatus according to claim 1, wherein the processing for causing the information processing apparatus to acquire the Bootstrapping information is processing of providing the Bootstrapping information to the information processing apparatus by wireless communication.

4. The apparatus according to claim 1, wherein
the operation in the second mode is started in the communication apparatus based on the failure of the attempted establishment of the first wireless connection due to a predetermined factor, and
the establishment of the first wireless connection is attempted again based on the failure of the attempted establishment of the first wireless connection due to another factor different from the predetermined factor.

5. The apparatus according to claim 4, wherein the predetermined factor includes at least one of (a) an error in which the communication by the DPP with the information processing apparatus is interrupted, (b) an error in which authentication needed to perform the communication by the DPP with the information processing apparatus fails, and (c) an elapse of a predetermined time without success of the establishment of the first wireless connection in a state in which the communication apparatus is operating in the first mode using the communication by the DPP.

6. The apparatus according to claim 4, wherein the operation in the second mode is started in the communication apparatus based on the failure of the establishment of the first wireless connection attempted again.

7. The apparatus according to claim 1, further comprising a communication unit configured to, if the establishment of the first wireless connection succeeds, perform communication by a specific protocol different from the DPP via the establishment of the first wireless connection.

8. The apparatus according to claim 7, wherein the specific protocol is at least one of Port 9100, SNMP, CHMP, and a protocol unique to a vendor of the communication apparatus.

9. The apparatus according to claim 1, further comprising an information providing unit configured to execute processing for causing the information processing apparatus to acquire specific information used by the information processing apparatus for establishment of the second wireless connection.

10. The apparatus according to claim 9, wherein the specific information is acquired by the information processing apparatus along with the acquisition of the Bootstrapping information by the information processing apparatus.

11. The apparatus according to claim 9, wherein
the processing for causing the information processing apparatus to acquire the Bootstrapping information and the processing for causing the information processing apparatus to acquire the specific information are processes of displaying, on a display unit of the communication apparatus, codes that correspond to the Bootstrapping information and the specific information and are readable by the information processing apparatus, and
if the codes are read by the information processing apparatus, the Bootstrapping information and the specific information are acquired by the information processing apparatus.

12. The apparatus according to claim 11, wherein the processing for causing the information processing apparatus to acquire the Bootstrapping information and the processing for causing the information processing apparatus to acquire the specific information are processes of providing the Bootstrapping information and the specific information to the information processing apparatus by wireless communication.

13. The apparatus according to claim 9, wherein the specific information includes at least one of a MAC address, an SSID, and a password.

14. The apparatus according to claim 1, wherein
the connection information includes an SSID corresponding to the external access point.

15. The apparatus according to claim 1, further comprising a print unit configured to execute printing.

16. A control method of a communication apparatus capable of communicating with an information processing apparatus, comprising:
starting, in the communication apparatus, an operation in a first mode for waiting for a request of a network setup via a communication by a Device Provisioning Protocol (DPP) from the information processing apparatus, the first mode being as a network setup mode in which the network setup is for causing the communication apparatus to connect with an external access point outside the information processing apparatus and outside the communication apparatus;

receiving connection information for connecting with the external access point via the communication by the DPP, in a case where the request of the network setup is accepted from the information processing apparatus that has acquired the Bootstrapping information;

attempting establishment of first wireless connection between the external access point and the communication apparatus using the connection information;

ending the operation in the first mode in the communication apparatus, based on a failure of the attempted establishment of the first wireless connection, and starting an operation in a second mode for establishing second wireless connection by Wi-Fi DIRECT (WFD) without intervention of the external access point between the information processing apparatus and the communication apparatus, the second mode being as the network setup mode; and establishing the second wireless connection after the start of the operation in the second mode.

17. A system including a terminal apparatus and a communication apparatus capable of communicating with an information processing apparatus, wherein the communication apparatus comprises:
 a first operation start unit configured to start, in the communication apparatus, an operation in a first mode for waiting for a request of a network setup via a communication by a Device Provisioning Protocol (DPP) from the information processing apparatus, the first mode being as a network setup mode in which the network setup is for causing the communication apparatus to connect with an external access point outside the information processing apparatus and outside the communication apparatus;
 a reception unit configured to receive connection information for connecting with the external access point via the communication by the DPP, in a case where the request of the network setup is accepted from the information processing apparatus that has acquired the Bootstrapping information;
 an attempt unit configured to attempt establishment of first wireless connection between the external access point and the communication apparatus using the connection information;
 a second operation start unit configured to end the operation in the first mode in the communication apparatus, based on a failure of the attempted establishment of the first wireless connection, and start an operation in a second mode for establishing second wireless connection by Wi-Fi DIRECT (WFD) without intervention of the external access point between the information processing apparatus and the communication apparatus, the second mode being as the network setup mode; and
 a connection unit configured to establish the second wireless connection after the start of the operation in the second mode, and the terminal apparatus comprises:
 an acquisition unit configured to acquire the Bootstrapping information;
 a transmission unit configured to transmit the connection information using the communication by the DPP; and
 a connection unit configured to establish the second wireless connection if the attempted establishment of the first wireless connection fails in the communication apparatus.

* * * * *